US 9,897,138 B2

(12) United States Patent
Serafini et al.

(10) Patent No.: US 9,897,138 B2
(45) Date of Patent: Feb. 20, 2018

(54) METHOD FOR PRELOADING A HUB BEARING UNIT

(71) Applicants: Andrea Serafini, Pinerolo (IT); Flavio Franza, San Secondo di Pinerolo (TO) (IT); Laura Sguotti, Pinerolo (IT); Domenico Bosco, Borgaro Torinese (IT); Cornelius Petrus Antonius Vissers, Den Dungen (NL)

(72) Inventors: Andrea Serafini, Pinerolo (IT); Flavio Franza, San Secondo di Pinerolo (TO) (IT); Laura Sguotti, Pinerolo (IT); Domenico Bosco, Borgaro Torinese (IT); Cornelius Petrus Antonius Vissers, Den Dungen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 24 days.

(21) Appl. No.: 15/140,056

(22) Filed: Apr. 27, 2016

(65) Prior Publication Data

US 2016/0348715 A1  Dec. 1, 2016

(30) Foreign Application Priority Data

Apr. 29, 2015  (IT) ........................ 102015000013555

(51) Int. Cl.
*F16C 43/04* (2006.01)
*F16C 19/18* (2006.01)
*F16C 35/06* (2006.01)

(52) U.S. Cl.
CPC .............. *F16C 19/18* (2013.01); *F16C 35/06* (2013.01); *F16C 43/04* (2013.01); *F16C 19/187* (2013.01);
(Continued)

(58) Field of Classification Search
CPC ..... F16C 2229/00; F16C 19/187; F16C 35/06
See application file for complete search history.

(56) References Cited

U.S. PATENT DOCUMENTS 3,330,634 A    7/1967  Rae
4,106,827 A *  8/1978  Ducret .................. F16C 19/187
                                                         384/482
(Continued)

FOREIGN PATENT DOCUMENTS

DE    102005049454 A1   4/2007
EP       2602123 A1     6/2013
FR       2888625 A1     1/2007

*Primary Examiner* — Thomas R Hannon
(74) *Attorney, Agent, or Firm* — Bryan Peckjian; SKF USA Inc. Patent Dept.

(57) ABSTRACT

A method for axially preloading a bearing hub assembly having a rotatable hub, provided with rolling tracks and a bearing unit having a stationary radially outer ring, provided with rolling tracks, and a double row of rolling bodies disposed between the radially outer ring and the hub. The method requires the use of a bias unit and provides the following steps: a) feeding to an assembly station a hub bearing assembly, already assembled; b) verifying the value of the interference (C) between the radially outer ring and the bias unit; c) exerting an axial force (F) radially on the outer ring for the bias unit to deform under compression the radially outer ring that in turn will transmit a force to the rolling bodies via the raceways.

6 Claims, 4 Drawing Sheets

(52) U.S. Cl.
CPC ...... *F16C 2229/00* (2013.01); *F16C 2326/02* (2013.01)

(56) References Cited

U.S. PATENT DOCUMENTS

| | | |
|---|---|---|
| 6,955,474 B2 | 10/2005 | Barbiero et al. |
| 7,380,334 B2 * | 6/2008 | Ulmann .................. F16C 25/06 29/446 |
| 2007/0098315 A1 * | 5/2007 | Komori .................. B60B 27/00 384/544 |

* cited by examiner

METHOD FOR PRELOADING A HUB BEARING UNIT

CROSS-REFERENCE TO RELATED APPLICATIONS

This application claims priority to Italian patent application no. 102015000013555 filed on Apr. 29, 2015, the contents of which are fully incorporated herein by reference.

TECHNICAL FIELD OF THE INVENTION

The present invention relates to a method for preloading a bearing unit flanged hub, i.e. the so-called third generation rolling bearing. The unit in question is suitable for applications where the outer ring of the bearing is stationary, or for applications at a driving wheel of a motor vehicle.

TECHNICAL BACKGROUND

Examples are known in the state of techniques of bearing groups for a flanged hub for driving wheels in motor vehicle applications. The document EP 2602123 A1, for example, describes an asymmetrical hub bearing unit for the wheel of a motor vehicle. The hub bearing unit in this example includes a flanged hub rotatable around a rotation axis, a flange integral with the hub flanged and transverse to the axis of rotation, a stationary ring disposed radially outside of the flanged hub and provided with rolling tracks axially spaced from one another, and two rolling bodies crowns (for example, balls) arranged between the stationary ring and the flanged hub. The flanged hub integrally forms a radially inner raceway for the ball bearing axially outer, while the radially inner raceway for the balls axially inner crown is formed on an inner ring of the bearing, radially outer planted on flanged hub.

Such a realization, especially in the case of heavy duty applications in terms of load transmitted, entails considerable local loads between the bearing rings and rolling bodies. Also, it does not permit obtaining large values of resistance of the bearing and its greater duration in time. Finally, it usually presents important axial dimensions because of the presence of a flange integral to the flange portion and the hub transverse to the axis of rotation.

To increase the performance and especially the stiffness of the bearing, an increase in the distance of the pressure centers is required. This can be achieved by increasing the diameter of the circumference of the centers of the rolling bodies (the so-called "pitch diameter" or more simply "pitch") of the bearing. Such solutions are already known and are developed in order to significantly improve the performance. The disadvantage connected to the increase of the "pitch" is that consequently also the volume and therefore weight dramatically increases with the "pitch-squared value". This increase in weight usually cannot be accepted by car manufacturers.

Another improvement involves further increasing the diameter of the circumference of the centers of the rolling bodies so as to be able to enter inside the bearing constant velocity joint and integrate in a single piece the so-called bell of the joint with the hub, or with the inner ring of the bearing. Evidently, the integration of both components allows the reduction of weight and cost of the entire unit and makes it possible to further reduce weight and costs by also integrating the small inner ring of the bearing, the axially internal, with the bell of the joint. In other words, the hub also assumes the function of single inner ring of the bearing and the bell of the joint at a constant speed.

The concept of a single inner ring is already known in so-called third-generation bearings. The main difference as compared to the other known solutions exists in the fact that the bearing has an axial clearance, which is not axially preloaded. This feature, in the past, has been accepted for standard applications with no particularly heavy load conditions, and also because the bearing design did not allow the generation of no axial preload. With the development of applications that require high performance, this situation is no longer acceptable and the bearing must necessarily be axially preloaded.

There exists, therefore, the need to develop a method for preloading a bearing hub unit with high performance.

SUMMARY OF THE INVENTION

The object of the present invention is to provide a method for axially preloading a bearing hub unit for application of the driving wheel of a motor vehicle. The above method is applicable in the case of bearings with symmetrical internal form such as bearings with the same "pitch" for the two crowns of rolling bodies and in the case of asymmetric bearings such as bearings with a different "pitch" between the two crowns of rolling bodies of.

According to the present invention, a method is described, for axially preloading a bearing hub assembly, having the characteristics set out in the appended independent claim.

Additional embodiments of the invention, preferred and/or particularly advantageous, are described according to the characteristics set forth in the appended dependent claims.

BRIEF DESCRIPTION OF SEVERAL VIEWS OF THE DRAWINGS

The invention will now be described with reference to the accompanying drawings, which illustrate some examples of non-limiting embodiments, in which.

DETAILED DESCRIPTION OF THE INVENTION

Figure 1:
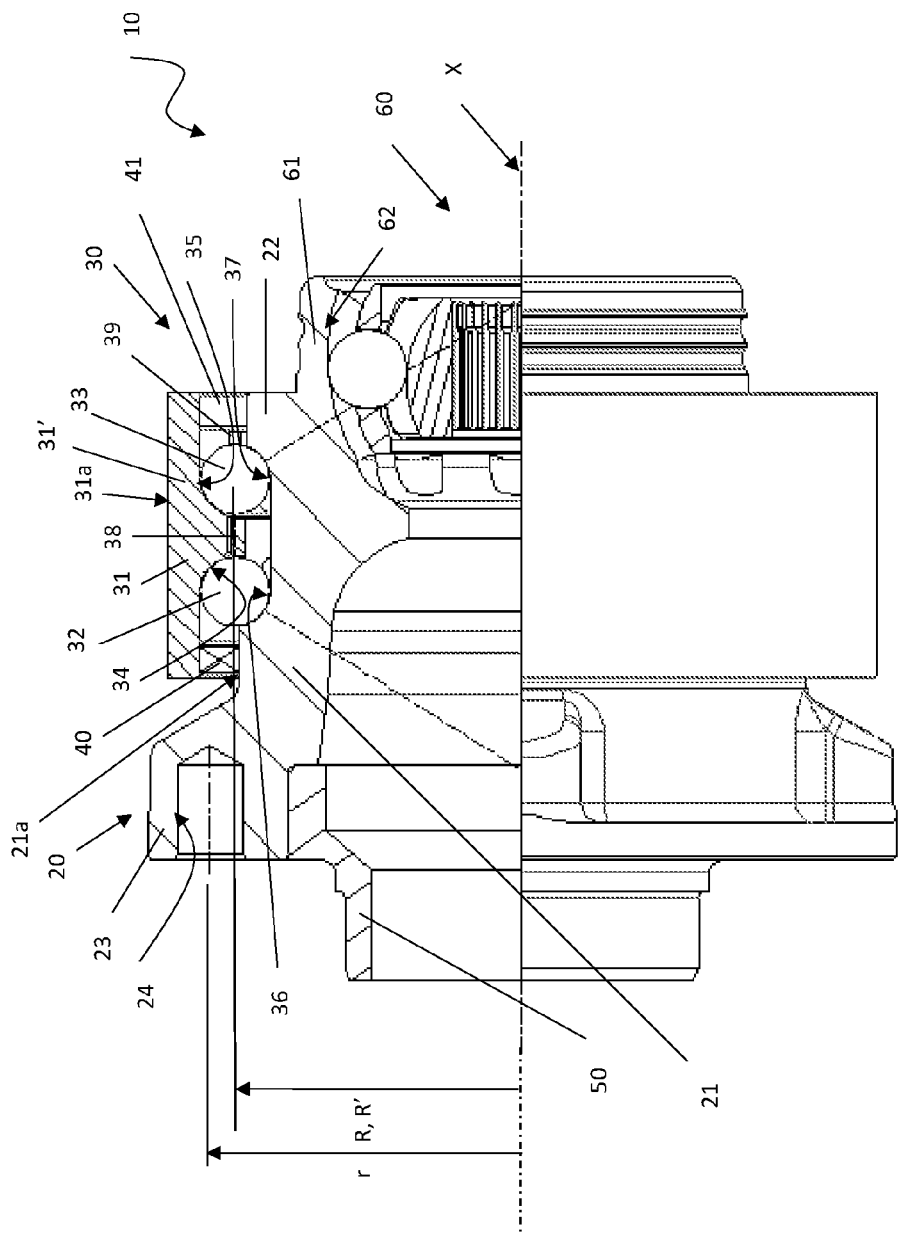
FIG. 1 is an axisymmetric sectional view of a hub bearing assembly of symmetric inner shape.

Referring now to FIG. 1, a hub bearing assembly according to a preferred embodiment of the invention is indicated as a whole with 10.

The assembly 10 includes a rotatable hub 20 and a bearing unit 30. The hub 20, as will be seen better hereinafter, is configured to also take the inner rolling loop function of the bearing bell and a joint of constant speed drive. Throughout the present description and in the claims, terms and expressions indicating positions and orientations such as "radial" and "axial" refer to the axis X of the central bearing rotation unit 30. Expressions such as "axially outer" and "axially inner" are, however, referred to the mounted condition, and in this case, preferably, refer to a wheel side and, respectively, to a side opposite to the wheel side.

The bearing unit 30 comprises a stationary, radially outer ring 3 and two crowns of rolling bodies 32 and 33, which in this example are balls interposed between the radially outer ring 31 and the hub 20 with radially inner ring function. For simplicity of graphic representation references 32 and 33 will be attributed both to individual spheres and to the crown of spheres. In particular, 32 will indicate the ring of balls or the single axially outer sphere, and 33 will indicate the ring of balls or the single axially inner sphere. Again for simplicity, the term "sphere" may be used by way of example in the present description and in the accompanying drawings instead of the more generic term "rolling body" (and will also be using the same numerical references). It will always be understood that in place of the spheres any other type of rolling bodies may be covered (for example, rollers, tapered rollers, needles, etc.).

Figure 2:
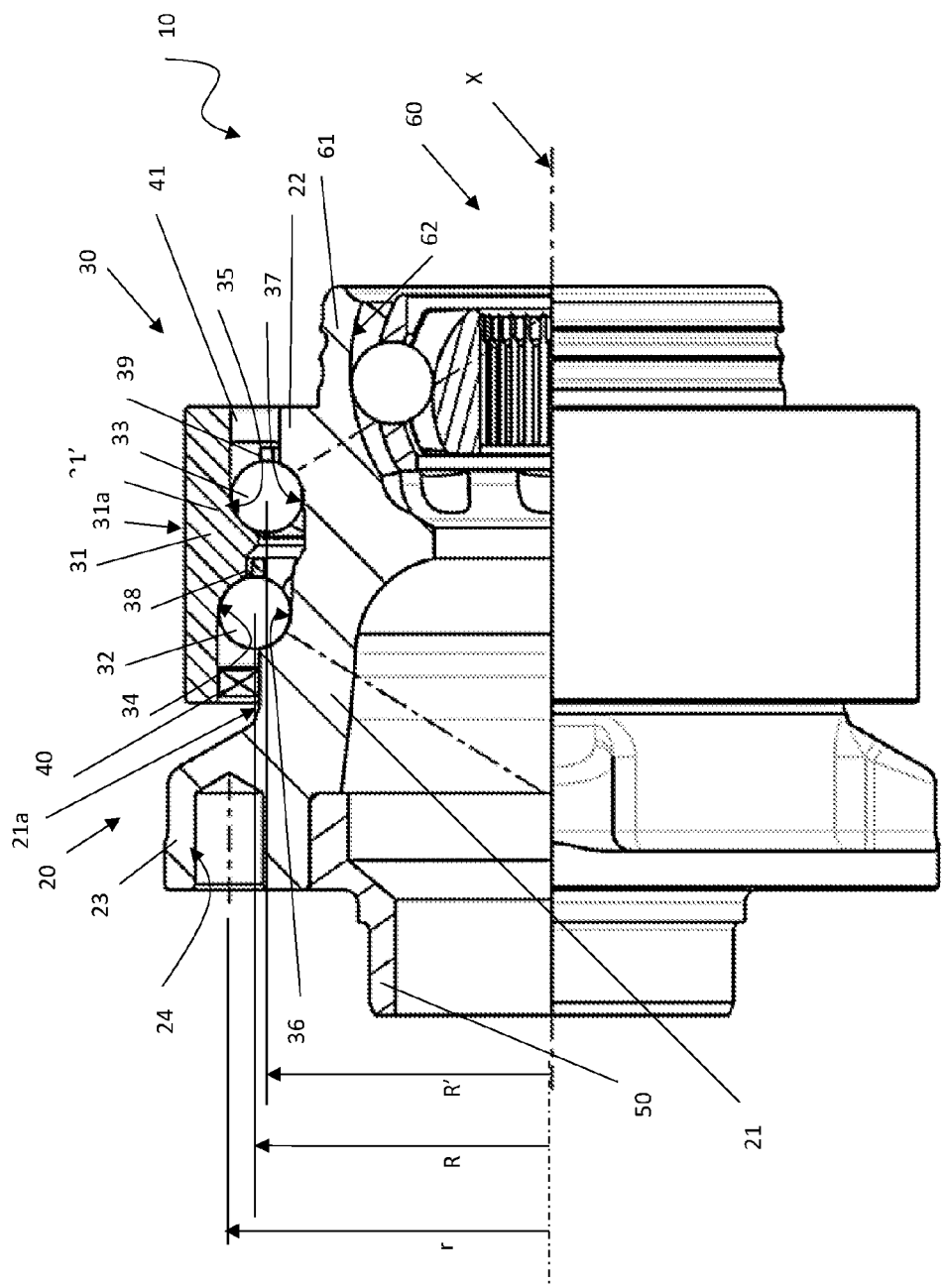
FIG. 2 is an axisymmetric sectional view of a hub bearing assembly of asymmetric internal form.

FIG. 1 shows the example or case of a symmetrical bearing i.e., with the same "pitch" for both crowns of rolling bodies. What will be said in the following description is also applicable to the case of the asymmetrical bearing, as shown in FIG. 2 where for simplicity we have used the same references. As shown, the only substantial difference between the two types of bearing is in the case of a symmetrical bearing where the radii R and R' of the circumferences of the centers of the rolling bodies of the corresponding crowns 32 and 33 assume the same value, but in case of an asymmetrical bearing the radii differ between them. In FIG. 2, for example, the radius R of the circle of the centers of the rolling bodies of the crown 32, axially outer, is greater than the radius R' of the circumference of the crown of the rolling bodies of the centers 33, axially inner.

The radially outer ring 31 is preferably shaped in tubular form axially extended, and defines internally the raceways 34 and 35 corresponding to the rolling bodies of the crowns 32 and 33.

The radially outer ring 31 has a radially outer cylindrical surface 31a adapted to mate with a cylindrical seat formed in a fixed member of the vehicle, such as a pillar of a suspension, of a known type and not shown in Figures. The cylindrical surface 31a extends for the entire axial dimension of the radially outer ring 31 and has an axial dimension of the order of magnitude of that of the cylindrical seat of the upright. On top of the raceways 34 and 35, the outer ring also presents a tubular portion 31'.

The rolling bodies of the crowns 32 and 33 rotate on the ring radially outer 31 as well as on a central tubular portion 21 of the hub 20 which defines a rolling track 36 for the rolling bodies of the axially outer crown 32 and a track of 37 for the rolling of rolling bodies of the crown 33, the axially inner. The crowns 32 and rolling bodies 33 are kept in position by corresponding cages 38 and 39, namely a first cage 38, axially outer, for the rolling bodies 32 and a second cage 39, axially inner, for the rolling bodies 33. The pockets of the cage 38 housing the balls are directed in an axially outer direction (as shown in FIGS. 1 and 2) even if the cage 38 can be mounted according to an alternative procedure in order to have the pockets facing in the direction axially inner. The cage pockets 39 are addressed according to the axially outward direction.

A first sealing means 40 seals the bearing unit from the axially outer side, being planted on a cylindrical surface 21a, a radially outer, of the tubular portion 21 of the hub 20 and a second sealing means 41 seals the bearing unit from the axially inner side.

The hub 20 also defines a shoulder 22, on the axially inner side, and a flange portion 23 axially outer. The flange portion has a plurality of axial fixing holes 24, the axes of which are arranged along a circumference of radius r, with respect to the axis of symmetry X. These holes are the seats for the same number of fixing means (such as captive bolts, not shown in the figure) that connect in a known manner an element of the motor vehicle wheel, for example the brake disc (also of known type and not shown in the figure), to the hub 20.

Advantageously, a bushing 50 for centering the wheel of the motor vehicle can be realized by means of a metal sheet, for example of steel, and coupled to the flange portion 23 of the hub, preferably by means of a simple pressing-fit operation.

The bearing unit 30 is made so as to obtain the radii R and R' of the circumferences of the centers of the rolling bodies of the corresponding crowns 32 and 33 slightly lower than or substantially equal to the radius r of the circumference of the fixing axes of the holes 24. This substantial geometrical equality, in the case of asymmetrical bearing, will be verified at least with the radius R of the circle of the centers of the rolling bodies 32, axially external i.e., closest to the wheel of the motor vehicle brake disc. In this embodiment, the flanged hub assumes a conformation in the manner of a rotor i.e., its flange portion is much reduced. The above solution is obtained by increasing the radii R and R' of the circumferences of the centers of the rolling bodies and of course, leaving unaltered, in the case of a constraint of the motor design, the radius r of the circumference of the fixing axes of the holes 24.

The transmission of the motion from a drive shaft of a motor vehicle transmission assembly (not shown) is guaranteed by a constant velocity joint 60. In particular, the outer bell of the coupling 60 is integrated in the hub 20 which in its axially inner terminal part 61 defines the track 62 of the joint.

The procedure for mounting the bearing assembly hub illustrated in FIGS. 1 and 2 was defined ex novo as it requires special care. Two possible solutions for assembling the assembly have been described in two different and parallel patent applications, which will become accessible to the public almost simultaneously to the content of the present patent application. Anyway, all the mounting procedures for bearings having a double ball bearing with only one inner ring and one outer ring, including new methods mentioned above, are suitable for bearings with game. Therefore, it is necessary to generate the preload on the bearing hub assembly already assembled.

Figure 3:
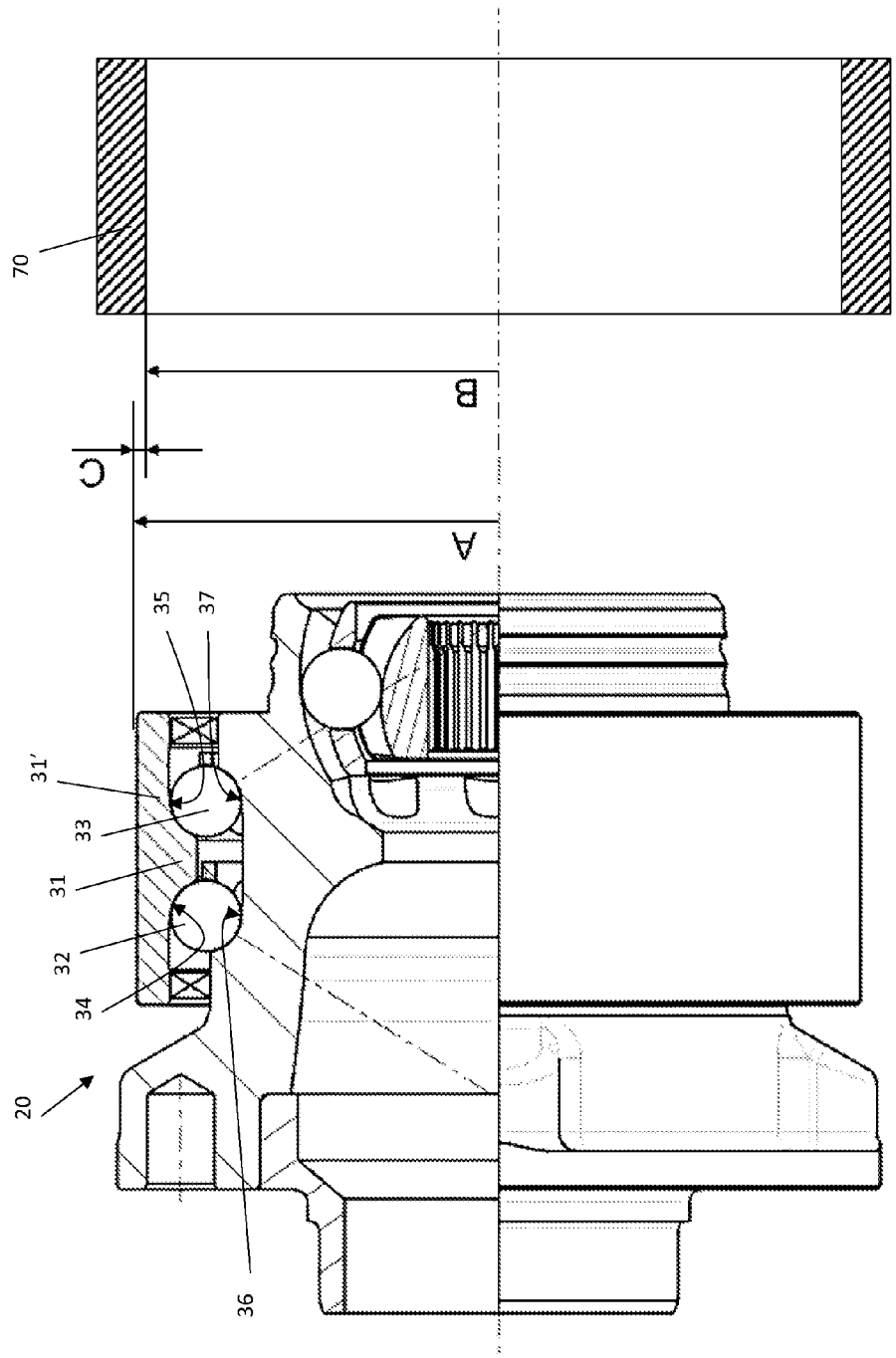
FIG. 3 illustrates the geometrical conditions to be imposed to the tool that generates the preload on the bearing.
Figure 4:
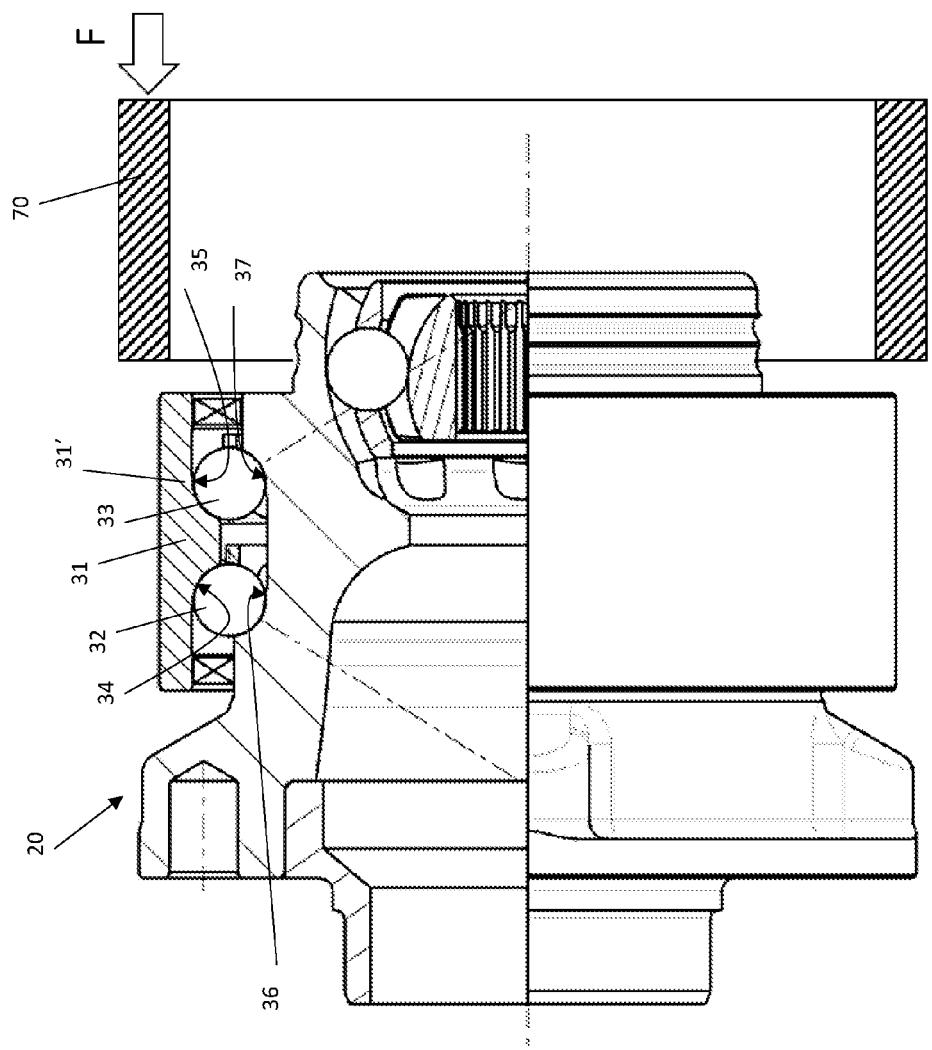
FIG. 4 schematically shows the step of generation of the preload.

The following will describe the new method for the generation of the axial preload on the bearing, with the aid of FIGS. 3 and 4. This method is based on the ring deformability radially outer 31.

In more detail, as visible in FIG. 3, the radially outer ring 31 comprises the tubular portion 31' on which a pressure is exerted from outside. The effect of the pressure tends to compress the ring 31. By appropriately calibrating the value of the pressure, the outer ring compression causes a pressure to also be generated between the rolling bodies 32, axially outside, and the respective tracks 34, radially outer, and 36, the radially inner. The same pressure will also be generated between the rolling bodies 33, axially inner, and the respective tracks 35, radially external, and 37, the radially inner. This state of stress between the rolling elements and respective tracks is precisely the desired axial preload.

In order to generate this state of stress, it is possible to act on the interference between the radially outer ring 31 and a biasing means 70, which advantageously may be the upright of a suspension or any other tool of annular shape. In practice, for A, the ring outer radius of the radially outer 31, and for B, the inner radius of the means of annular thrust, the C interference will be given by:

$$C=A-B.$$

The interference C corresponds to the axial preload such that the greater the interference C, the higher the axial preload generated on the crowns of the rolling bodies 32 and 33.

The extent of the deformation of the outer ring 31 depends on the ratio between the diameter of the circumference of the rolling bodies (the "pitch") and the outer ring thickness, or rather of its tubular portion 31'. In the case of the solutions described above (therefore both in the case of symmetrical bearing and the case of an asymmetrical bearing) with high value of the "pitch", the outer ring deformation is greater than that of a bearing with small value of "pitch". As a result, the thickness of the outer ring will properly be sized to avoid excessive deformations. On the contrary, in the case of small values of "pitch", you will have to use a radially outer ring with smaller thickness of the tubular portion, so as to ensure the sufficient axial preload the bearing unit.

The radially outer ring 31 must not necessarily have a completely cylindrical shape. For example, protrusions or grooves may be present to improve the locking of the strut of the suspension in the correct position. What is important is that both of the cylindrical portions are immediately above the rolling tracks.

This solution allows generation of the axial bearing preload on the unit, even if one is forced to utilize a mounting procedure that leaves the bearing with axial play. Without this solution, it would be impossible to generate a preload and, therefore, the solution with a single inner ring would not be usable because the mounting procedures devised by the same Applicant leave the bearing with axial play.

So, thanks to the axial preload generation method, as defined, you can use these new buffer solutions whose performance is greatly improved compared to the standard solution. Since the "pitch" of the spheres is increased, the distance between the pressure centers is also increased with very positive effects in terms of stiffness.

The useful life of the bearing is not subject to penalties, since the number of balls used is comparable with that required by the standard solutions. On the contrary, the weight of these solutions was reduced greatly with regard to the compactness of the realized solution, and considered as a whole. In fact, while the bearing coupling constant speed remains substantially the same weight, the upright of the suspension can reduce a remarkable amount of material.

Finally, not negligible are also the benefits for having reduced the costs of the solution and the total number of components.

In addition to the embodiments of the invention, as described above, it is to be understood that there are many further variants. It must be understood that these embodiments of implementation are only illustrative and do not limit the invention or its applications, nor its possible configurations. On the contrary, although the description above makes it possible to manufacture an implementation of the present invention, it should be understood that numerous variations are conceivable for the components described, without that for this will come out from the object of invention, as defined in the appended claims, interpreted literally and/or according to their legal equivalents.

The invention claimed is:

1. A bearing hub assembly comprising:
   a rotatable hub provided with an axially external flange portion, configured for the engagement to a rotatable component of a motor vehicle,
   a bearing unit providing a stationary radially outer ring, configured for the engagement to a stationary component of a motor vehicle, a first row of axially external rolling bodies, and a second row of axially internal rolling bodies that are disposed between the radially outer ring and the hub, and
   the stationary radially outer ring transmitting an axial preload force to the first row of axially external rolling bodies and the second row of axially internal rolling bodies, wherein
   the hub also functions as a radially inner ring of the bearing unit and a bell of a constant velocity joint.

2. A method for axially preloading a bearing hub assembly, the assembly comprising:
   a rotatable hub that functions as a radially inner ring, provided with raceways and a bell of a constant velocity joint,
   a bearing unit having a stationary radially outer ring, provided with raceways, with a first row of axially external rolling bodies, and a second row of axially internal rolling bodies disposed between the radially outer ring and the hub, the method requiring the use of thrust means and having the following steps:
   a) feeding a bearing hub assembly to a mounting station,
   b) verifying the value of the interference (C) between radially outer ring and thrust means,
   c) providing an axial force (F) on the radially outer ring by the thrust means, to press the radially outer ring that in turn transmits a force to the rows of rolling bodies, by means of the raceways.

3. The method according to claim 2, wherein during step c) the axial force is provided on a tubular portion, located above the raceways.

4. The method according to claim 2, wherein the interference value (C), to be verified during the phase b), is given by the difference between the external radius (A) of the radially outer ring and the internal radius (B) of the thrust means.

5. The method according to claim 2, wherein the biasing means has an annular shape.

6. The method according to claim 2, wherein the biasing means corresponds to the suspension knuckle of a motor vehicle.

* * * * *